(12) United States Patent
Townend et al.

(10) Patent No.: US 6,801,772 B1
(45) Date of Patent: Oct. 5, 2004

(54) CELLULAR MOBILE TELEPHONE NETWORK OPERATION

(75) Inventors: Jonathan Richard Townend, Suffolk (GB); Nigel Clive Lobley, Suffolk (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/831,296

(22) PCT Filed: Nov. 19, 1999

(86) PCT No.: PCT/GB99/03875

§ 371 (c)(1),
(2), (4) Date: May 8, 2001

(87) PCT Pub. No.: WO00/35230

PCT Pub. Date: Jun. 15, 2000

(30) Foreign Application Priority Data

Dec. 8, 1998 (EP) .............................................. 98310036

(51) Int. Cl.[7] ................................................ H04Q 7/20
(52) U.S. Cl. ........................ 455/436; 455/437; 455/424; 370/332
(58) Field of Search ................................ 455/437, 436, 455/424, 426.2, 525, 439; 370/331–333

(56) References Cited

U.S. PATENT DOCUMENTS

| | | | | |
|---|---|---|---|---|
| 5,267,261 A | * | 11/1993 | Blakeney, II et al. | ........ 370/332 |
| 5,778,075 A | * | 7/1998 | Haartsen | ...................... 380/272 |
| 5,839,070 A | * | 11/1998 | Lupien et al. | ............... 455/440 |
| 5,915,219 A | * | 6/1999 | Poyhonen | ................. 455/435.2 |
| 5,920,817 A | * | 7/1999 | Umeda et al. | ............... 455/437 |
| 5,920,818 A | * | 7/1999 | Frodigh et al. | ............. 455/443 |
| 6,295,450 B1 | * | 9/2001 | Lyer et al. | .................... 455/436 |
| 6,434,389 B1 | * | 8/2002 | Meskanen et al. | .......... 455/437 |
| 6,510,146 B1 | * | 1/2003 | Korpela et al. | ............. 370/332 |
| 6,591,104 B2 | * | 7/2003 | Ohtani et al. | ............... 455/436 |
| 2002/0034947 A1 | * | 3/2002 | Soliman | ..................... 455/436 |

FOREIGN PATENT DOCUMENTS

| | | |
|---|---|---|
| EP | A-0 505 106 | 9/1992 |
| GB | A 2294181 | 4/1996 |
| WO | WO 94 06220 A | 3/1994 |
| WO | WO 97 14261 A | 4/1997 |

* cited by examiner

Primary Examiner—William Trost
Assistant Examiner—Sharad Rampuria
(74) Attorney, Agent, or Firm—Nixon & Vanderhye PC

(57) ABSTRACT

Where a call of one cellular telephone network has a cell of another network as neighbor, a dedicated control channel for a mobile station which is registered with the public network and whose subscriber has access privileges for the private network, carries neighboring cell data for the cell of the private network. Consequently, the mobile station (provides measurement reports for cells of both network and can be preferentially handed over to the cell of the private network by the public network.

21 Claims, 5 Drawing Sheets

CELLULAR MOBILE TELEPHONE NETWORK OPERATION

BACKGROUND OF THE INVENTION

1. Field of the Invention

The present invention relates to tailoring neighbouring base station information transmitted in a first cellular telephone network on the basis of the relationship between a subscriber and a second network.

2. Related Art

The present invention will be described with reference to the GSM (Global System for Mobile communication) standard because the skilled person is familiar with this standard and will, therefore, more easily be able to understand how to implement a system according the present invention. Furthermore, details of conventional GSM are readily available from publications such as Mouly, M. et al, *"The GSM System for Mobile Communications"*, ISBN 2-9507190-0-7. However, the present invention is not merely a variant of GSM and may be applied to other cellular mobile telephone systems. Accordingly, terms having particular meanings within GSM are not to be construed as limiting the scope of protection sought to GSM systems.

GSM provides for a plurality of service providers to make available respective public land mobile networks within an area covered by the same regulatory authority. Typically the regulatory authority is a national PTT (Post, Telephone and Telegraph) authority.

Roaming between public land mobile networks in the same area may be provided by service providers. Assuming that a subscriber is able to roam between two networks, a choice needs to be made between the available networks. The subscriber's mobile station could scan all frequencies and register with the network having the strongest signal. This unfortunately is time consuming and very demanding on power. Consequently, in order to maximise battery life, GSM900, phase 1 adopts the practice of the serving base station transmitting a list of beacon identities of neighbouring base stations, and the mobile station only scans these identities. This approach is not optimum from the point of view of service providers because once a subscriber has roamed to another network, for instance as a result of a discontinuity in the coverage provided by the subscriber's home network, the subscriber will not return to his home network until the subscriber manually instructs his mobile station to register with his home network, he enters a discontinuity in the coverage of the current network or switches his mobile station off and then on again.

This is particularly undesirable when the home network is a private network, on which additional services or reduced call changes are available to its users. The private network may comprise a single base station, as is disclosed in International Patent Application WO98/03002. In the system described therein, a dual-mode cordless/cellular telephone (for example operational on the DECT and GSM standards) can have incoming calls, initially directed to the fixed telephone line associated with the cordless function, diverted to the handset's cellular identity when the cordless base station cannot detect the presence of the handset. However, if the handset is carried into or out of range of the cordless base station while a call is in progress, the call will continue on the system in which it was initiated, or fall if radio contact is lost on that system.

International Patent Specification WO94/06220 discloses a system in which there is a supplementary network whose base stations have a dedicated range of frequencies separate from that of the main network. Mobile stations having access to the supplementary network are arranged to scan these frequencies and use such base stations when available. However, as already discussed, this is very demanding on power and is time consuming. Moreover, it requires the supplementary network and main network to operate on distinct frequency ranges. This requires specialised mobile units capable of operation in both ranges, and precludes efficient frequency re-use. For example, International Patent Specification WO97/14261 discloses a system in which separate handover arrangements are provided for single-band and multi-band mobile units, in areas where some bands are not universally available.

BRIEF SUMMARY OF THE INVENTION

According to a first aspect of the present invention, there is provided a method of operating a cellular telephone system having a subset of base stations only available to some subscribers to the system, the method comprising:

transmitting, to each mobile station, neighbouring base station data for constructing a list of beacon identities for base stations neighbouring the mobile station's serving base station, the transmission being made in a control channel, dedicated to the particular mobile station, wherein the list of beacon identities includes members of the said subset only if the subset is available to the mobile station's subscriber, receiving signal reports from the mobile station for the plurality of bass stations, and selecting a base station for use by the mobile station based on said reports and on whether the base station is a member of the subset, the handover being controlled such that mobile stations for which access to the subset of base stations is permitted are not handed over to base stations not forming part of the subset unless the signal reports for the base stations indicate that reliable communication cannot be effected between the mobile station and any member of the subset.

By selecting the neighbour list according to the user identity, private cellular networks may be defined using the same frequency bands as the main network, with standard mobile units having permission to use the private network able to switch between systems automatically, but preferentially using the private network.

"Beacon identity" means the identity of a beacon on which a mobile station can meaningfully make signal strength/quality measurements. The neighbouring base station data may itself include beacon identities in the form of their actual frequency in Hz, kHz, MHz, rad/s etc. or a channel number. Alternatively, the neighbouring base station data may comprise data from which the mobile station can derive the beacon frequency, e.g. by an algorithm relating a base station identity code to beacon frequency. Similarly, the beacon frequency list need not literally comprise a list of frequencies. Rather the list must merely contain data sufficient for the mobile station to tune to the beacon, for example the scrambling code of a CDMA (code division multiple access) system.

In GSM, the use of SIM (subscriber identity module) cards means that the system features available to a subscriber are largely independent of the particular mobile station because they are governed by the SIM, which may be in many different mobile stations. However, the present invention is also applicable to systems in which a subscriber's identity corresponds to a mobile station's identity.

The base stations of the subset may be those of one network whilst those not in the subset may belong to one or more other networks. These networks may be physically distinct or logically distinct. Logically distinct networks may use the same hardware, for instance in the case of a virtual private network provided by a public land mobile network operator.

The present invention may be used to assist in the integration of a private cellular mobile telephone network and a public cellular mobile telephone network. However, it can be applied to the solution of many problems, including, but not exclusively so, handover between public networks at national borders for subscribers with roaming privileges. In this case, the mobile station of a subscriber with roaming privileges would be informed of beacon identities of the base stations of the network privileges would be informed of beacon identities of the base stations of the network in a neighbouring country when approaching the border in dedicated mode. Handover to a foreign network would only take place if signal quality on the home network (measured either as an absolute value or relative to the foreign network) fell below a specified threshold. Handover back to the home network would take place if signal quality on that network returned above that threshold.

Preferably, the transmitted data is configured for the generation of a beacon identity list including a beacon identity for a base station in said subset. This will occur when the subscriber has access privileges to base stations in the subset. The access privileges may be determined ad hoc. For instance traffic levels in the subset base stations may be taken into account with the result of the beacon identity of the base station in the subset not being transmitted, if the traffic capacity of that base station has been reached.

The cells, or coverage areas, served by the base stations in the subset, which may be a private network, may be much smaller than those not in the subset, which may constitute a public network. The small cells may, for example, cover a large industrial site wholly within a cell of a public network. Consequently, a "neighbouring" cell, belonging to the subset, may be located wholly within a cell not forming part of the subset. The areas of coverage of neighbouring base stations may be adjacent or overlap, or one may be included entirely within another.

The invention may also be used to allow handover of a suitably equipped mobile telephone, with suitable access rights, between different radio technologies, for example the mobile telephony standards known by the acronyms GSM, PCN (Personal Cellular Network), PDC (Personal Digital Cellular), UMTS (Universal Mobile Telecommunications System), and DECT (Digital European Cordless Telephony). Note that the technologies need not all be cellular (although at least one of them must be cellular): it is only necessary that a cellular network can have beacon identities of another system added to its neighbour list. The invention may, for example, be applied to a system such as that disclosed in the aforementioned International Patent Application WO98/03002, by adding the cordless base station to the cellular network's neighbour list for the dual purpose handset associated with that base station.

A method according to the present invention preferably comprises:

maintaining a record of the neighbour relationship between a first base station in the subset of base stations and a second base station not in the subset, determining whether the mobile station's subscriber, when the mobile station is located in said first base station of the first network, has an access-granting relationship with the base stations of the subset, and transmitting the data identifying the beacon identity of the second bass station in said dedicated control channel if the mobile station's subscribe has said access-granting relationship with the base stations of the subset.

However, other factors may be taken into account. For instance traffic levels in the second network may be taken into account with the result that the beacon identity of the base station of the second network is not transmitted if the traffic capacity of that base station has been reached.

The neighbouring base station data may be arranged to allow generation of a standard beacon identity list which is extended for the appropriate mobile stations to include a beacon identity of a base station in the subset. Alternatively, the subset base station data may replace non-subset base station data transmitted to other mobile stations.

A mobile station receiving a list transmitted in accordance with the present invention, will typically report signal measurements for the transmitted beacon identities. These reports can then be used for controlling handovers.

A handover of a mobile station currently served by a base station not of the subset to a base station of the subset may be initiated if the signal report for that base station indicates that reliable communication can be effected with the mobile station using that base station. Going the other way, preferably, handover of a mobile station currently served by a base station of the subset to a base station not of the subset, even if its signal reports are superior to those of the subset base stations, is only initiated if the signal reports indicate that reliable communication can not be continued using any base station in the subset.

According to a second aspect of the present invention, there is further provided a fixed cellular mobile telephony apparatus configured to operate according to the method according to the first aspect of the invention.

BRIEF DESCRIPTION OF THE DRAWINGS

An embodiment of the present invention will now be described, by way of example, with reference to the accompanying drawings, in which.

DETAILED DESCRIPTION OF EXEMPLARY EMBODIMENTS

Figure 1:
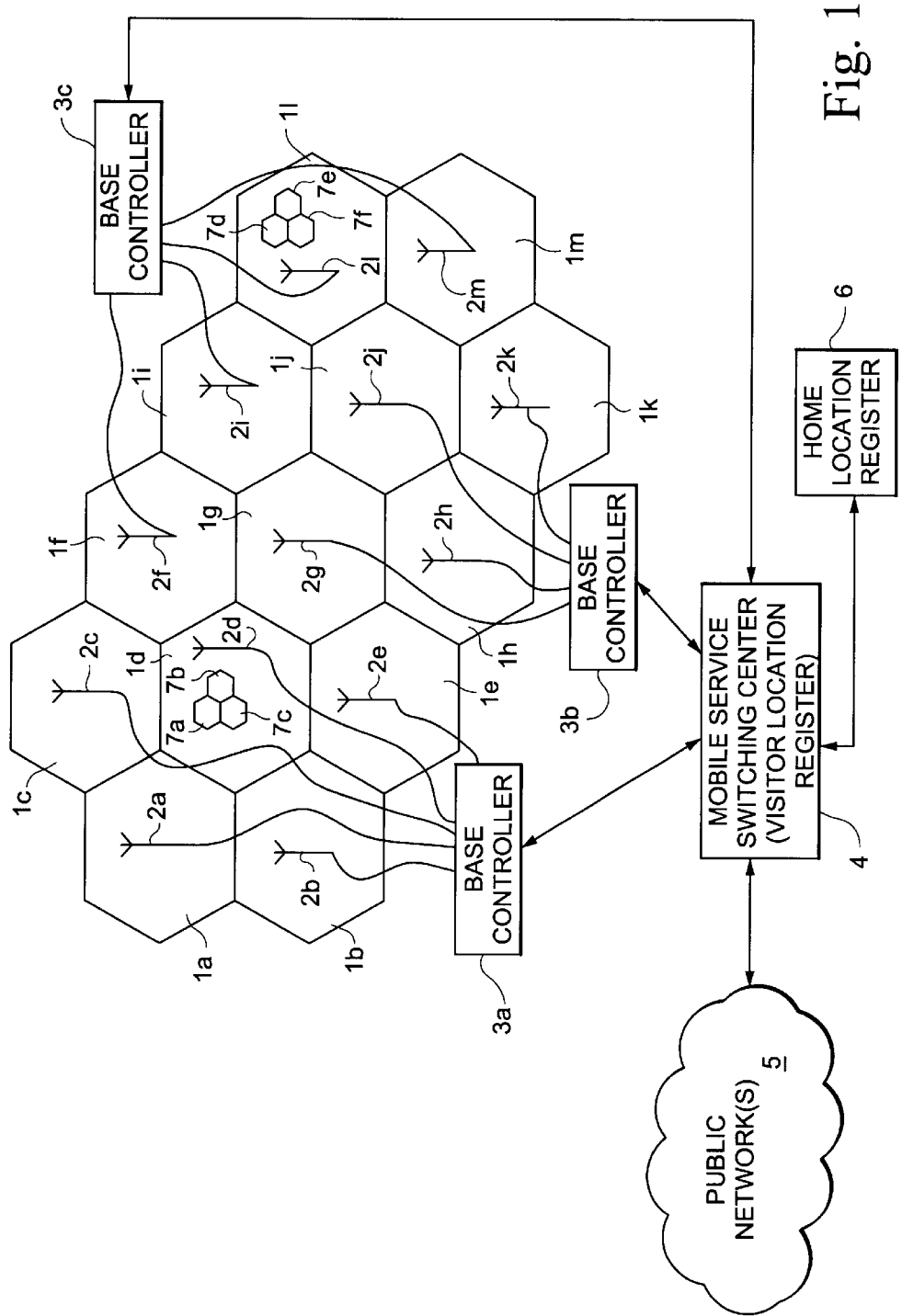
FIG. 1 shows a first cellular mobile telephone network having cells covering cells of a second cellular mobile telephone network.

Referring to FIG. 1, a public, cellular mobile telephone network comprises first to thirteenth cells $1a, \ldots, 1m$. Each of the cells $1a, \ldots, 1m$ of the public network is serviced by a respective base station $2a, \ldots, 2m$.

In the present example, the first to fifth cells $1a, \ldots, 1e$ comprise a first location area, the seventh, eighth, tenth and eleventh cells $1g, 1h, 1j, 1k$ comprise a second location area and the sixth, ninth, twelfth and thirteenth cells $1f, 1i, 1l, 1m$ comprise a third location area.

The cells $1a, \ldots, 1e$ of the first location area are serviced by a first base station controller $3a$. The cells $1g, 1h, 1j, 1k$ of the second location area are serviced by a second base station controller 3b. The cells 1f, 1i, 1l, 1m of the third location area are serviced by a third base station controller 3c. The base station controllers 3a, 3b, 3c are linked to the base stations 2a, . . . , 2m of their respective location areas.

Each of the base station controllers 3a, 3b, 3c is also linked to a mobile service switching centre 4. The mobile service switching centre 4 is connected to the rest of the public network and networks to which the public network is connected 5 and can communicate with a home location register 6. The mobile service switching centre 4 has a visitor location register integrated within it.

First to third cells 7a, 7b, 7c of a second, private, virtual cellular mobile telephone network are located within the fourth cell 1d of the public network and comprise a first location area of the private network. Three further cells 7d, 7e, 7f of comprise a first location area of the private network. Three further cells 7d, 7e, 7f of the private network are located within the twelfth cell 1l of the public network and comprise a second location area of the private network.

Figure 2:
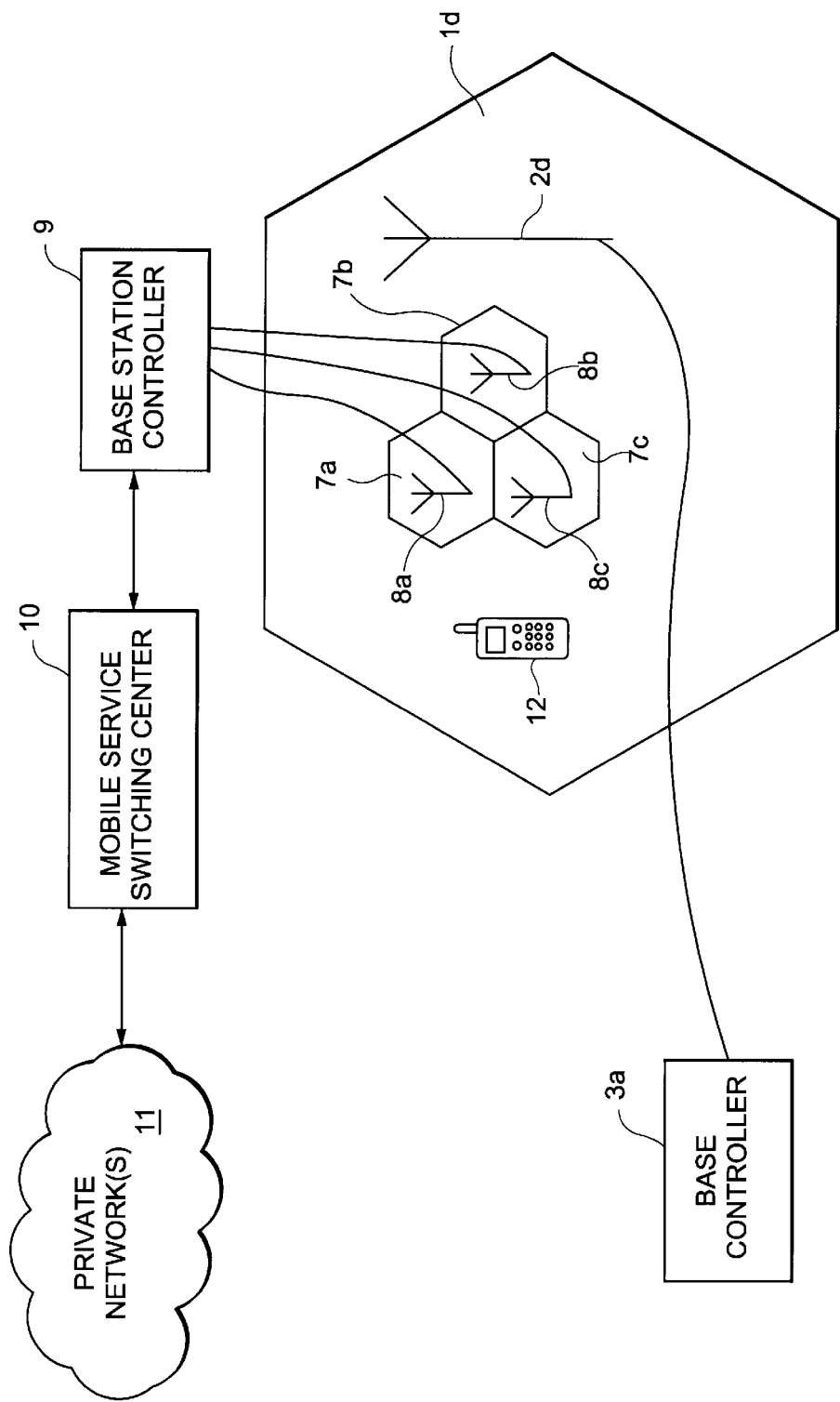
FIG. 2 shows a cell of the first network of FIG. 1 showing the second network in more detail.

Referring to FIG. 2, the first to third cells 7a, 7b, 7c of the private network are serviced respectively by first to third base stations 8a, 8b, 8c. The first to third base stations 8a, 8b, 8c of the private network are linked to a base station controller 9 of the private network. The base station controller 9 of the private network is also linked to a mobile service switching centre 10 of the private network. The mobile service switching centre 10 is linked to the rest of the private network and other networks 11 to which the private network is connected.

The provision of neighbouring base station data to a mobile station 12, whose home network is the private network, will now be described.

Since the private network is private, it does not in general permit roaming from the public network. However, the private network is provided by the provider of the public network and the owner of the private network subscribes to the public network so that mobile stations carried by its own employees can be used beyond the bounds of the private network.

Consider first the situation where the mobile station 12 is idle in a private network cell 7c. The broadcast control channel signals transmitted to the third cell 7c contains neighbour base station data for two base stations, namely the other two private network base stations 8a, 8b in the same private network location area.

The mobile station 12 monitors the beacon identities of the neighbouring base stations, specified in the broadcast control channel.

If the mobile station 12 is idle and moving from the third private network cell 7c to the first private network cell 7a, the mobile station 12 initially monitors the beacon identities of the neighbouring base stations, specified in the broadcast control channel of the third base station 8c of the private network. As the mobile station 12 moves towards the first cell 7a of the private network, the C1 figure for that cell's beacon 8a will increase and the C1 figure for the beacon 8c of the third cell 7c of the private network will decrease.

C1 is a measure of signal quality and is defined as follows:

$$C1 = A - MAX(B) \text{ where:}$$

A=the received signal strength average minus the receive signal strength commensurate with accessing the network (transmitted in the broadcast control channel), and:
B=the maximum transmit power that the mobile station may use in the random access channel (transmitted in the broadcast control channel) minus the maximum power output of the mobile station. All figures are in dBm.

When the C1 figure for the first base station 8a of the private network exceeds that for the third base station 8c of the private network, the mobile station 12 switches to monitoring the broadcast control channel of the first base station 8a of the private network. It is not necessary for the mobile station 12 to perform a location update because it is still in the same location area of the private network.

If the mobile station 12 is idle and moving from the first private network cell 7a to the fourth public network cell 1d, the mobile station 12 initially monitors the beacon identities of the neighbouring base stations, specified in the broadcast control channel of the first base station 8c of the private network. As the mobile station 12 moves towards an edge of first cell 7a of the private network, where it will cross out of the coverage area of the private network, the C1 figure for that cell's beacon will decrease to the point where communication via the first base station 8a of the private network is not possible. The mobile station 12 then has no knowledge of neighbouring base stations of another service provider and searches all beacon identities to find a base station to camp on when leaving the coverage area of the private network.

The private network service provider could arrange to transmit the beacon identity of the fourth base station 2d of the public network in the broadcast control channels of the first, second and third base stations 8a, 8b, 8c of the private network. However, this might often result in the mobile station 12 prematurely camping in the fourth cell 1d of the public network. This may not in practice be a major problem because in idle mode the mobile station 12 is not using any radio resources of the public network and, as will be explained below, would be handed back to the private network shortly after entering dedicated mode.

The problem of premature camping in a cell of the public network could also be avoided by changing the control program of the mobile station 12 so that it only tried to perform a location update with the public network when all base stations of the private network are unusable. Another approach would be to tailor the A and B figures for calculating C1 to introduce a bias towards the private network. This could be done by transmitting suitable values for the receive signal strength commensurate with accessing the network and the maximum transmit power that the mobile station may use in the random access channel.

To perform the location update, the mobile station 12 first sends a channel request in the random access channel and then monitors the paging and access grant channel for a channel assignment. The channel is allocated by the first base station controller 3a of the public network. When the mobile station 12 has received a channel assignment, it transmits a location updating request message in the assigned channel. The location updating request message includes the mobile station's subscriber's identity.

The location updating request is passed through to the mobile service switching centre 4 of the public network. The mobile service switching centre 4 sends the location updating request to the home location register 6. In this case, the home location register 6 replies with a location updating accept message. The mobile service switching centre 4 of the public network then enters the mobile station's subscriber in its visitor location register's database. The home location register 6 updates its own record of the location of the mobile station 12 and transmits an insert subscriber data message to the mobile service switching centre 4 of the public network. The additional data in the insert subscriber data message is also stored in the visitor location register of the mobile service switching centre 4 of the public network. This data includes the fact that the subscriber is a subscriber to the private network. The home location register 6 sends a deregister mobile subscriber message to the mobile service switching centre 10 of the private network. The mobile service switching centre 10 of the private network then deletes the mobile station's subscriber's record from its visitor location register.

From this point on, the mobile station 12 monitors the broadcast control channel of the fourth base station 2d of the public network. Since other subscribers, who do not have access to the private network, use this base station, the neighbouring base station data transmitted does not include data for the base stations of the private network. The neighbouring base station data is for the first, second, third, fifth, sixth and seventh base stations 2a, 2b, 2c, 2e, 2f, 2g of the public network.

If the mobile station 12 is idle and moving from the fourth public network cell 1d to the first private network cell 7a, it continues to monitor the beacon identities of the first, second, third, fifth, sixth and seventh base stations 2a, 2b, 2c, 2e, 2f, 2g of the public network because it is unaware that it has moved back into the first cell 7a of the private network.

Figure 3:
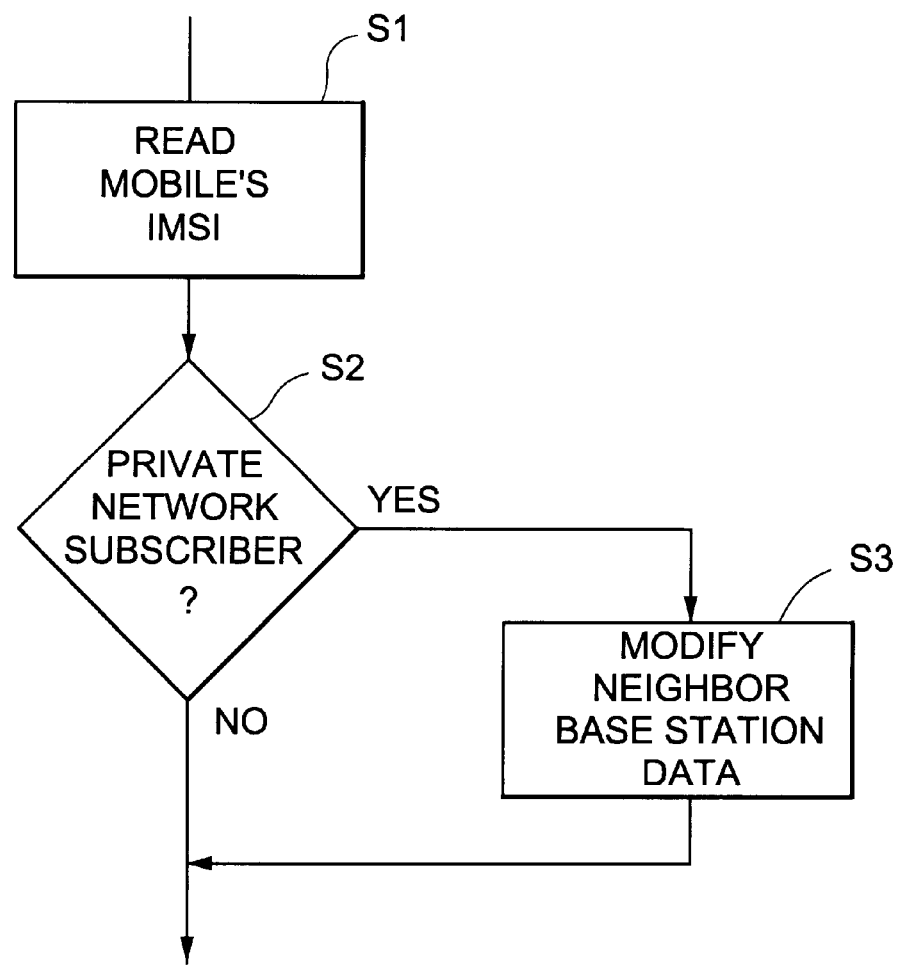
FIG. 3 is a flowchart illustrating the process of transmitting modified neighbouring base station data.

Referring to FIG. 3, when the mobile station 12 is in dedicated mode, it receives control data in a slow associated control channel. This data includes a plurality of neighbouring base station beacon identities. Under normal circumstances, this information would be the same as transmitted in the broadcast control channel. However, in the present case, the first base station controller 3a of the public network inspects the mobile network part of the mobile station's subscriber's IMSI (step s1) and determines that the subscriber subscribes to the private network (step s2). It therefore modifies the neighbour base station data (step s3), to be transmitted in the slow associated control channel, to include additionally the beacon identities of the first to third base stations 8a, 8b, 8c of the private network.

During gaps between transmit and receive time slots, the mobile station 12 measures the strengths of the signals on the beacon identities of the identified neighbour base stations and the signal strength of its current traffic channel. The traffic channel measurement and the best six neighbour base station measurements are reported back to the first base station controller 3a of the public network in the slow associated control channel by the mobile station 12.

Figure 4:
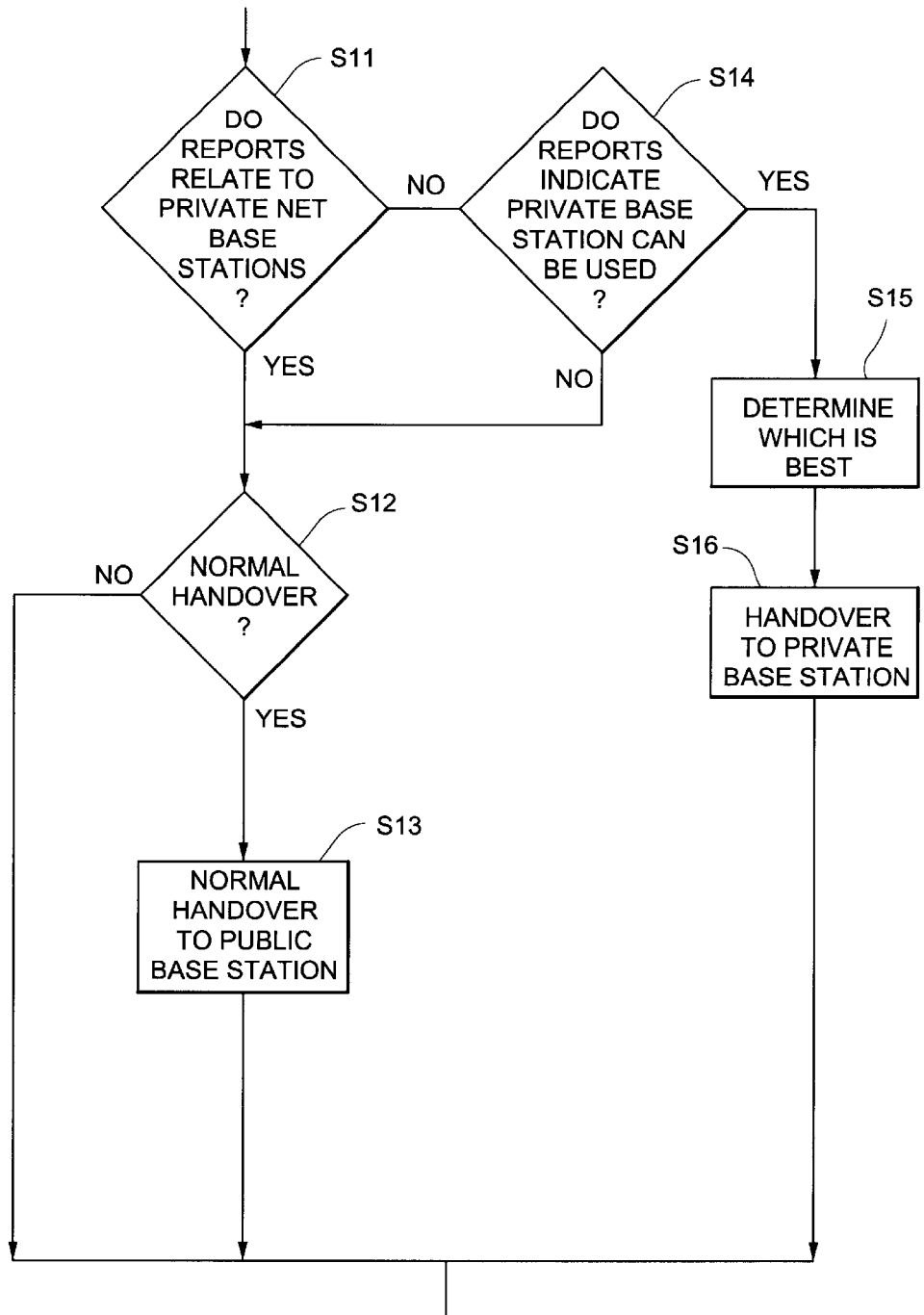
FIG. 4 is a flowchart illustrating a first handover in a system according to the present invention.

Referring to FIG. 4, when a set of measurement reports have been received by the first base station controller 3a of the public network, the first base station controller 3a determines whether any of the reports relate to base stations of the private network (step s11). If not, the first base station controller 3a determines (step s12) whether the normal handover process (step s13) should be carried out. If, however, any of the reports relate to base stations of the private network, the first base station controller 3a determines (step s14) whether any of the reports indicate that a base station of the private network can be used. If not, the remaining reports are analysed to determine whether a conventional handover is required and, if so, a handover to another base station of the public network is performed in the normal manner (step s13).

If it is determined that reports for one or more base stations of the private network indicate that those base stations can be used by the mobile station 12, the first base station controller 3a determines which is best (step s15) and starts a handover to the base station of the private network with the best measurement report.

The handover (step s16) to a base station of the private network is performed in the following manner.

The first base station controller 3a of the public network sends a handover required message to the mobile service switching centre 4 of the public network. The handover required message includes the identity of the target base station, for example the first base station 8a of the private network, and the origin base station, that is the fourth base station 2d of the public network. The mobile service switching centre 4 of the public network sends a perform subsequent handover message to another mobile service switching centre of the public network which acts as the anchor mobile service switching centre. The anchor mobile service switching centre then sends a perform handover message to the mobile service switching centre 10 of the private network via the networks 5, 11. The mobile service switching centre 10 of the private network passes on the information in the perform handover message to the base station controller 9 of the private network in a perform handover message. The base station controller 9 of the private network then allocates a channel in the first base station 8a of the private network to the mobile station 12.

Once the resources required for the handover have been established, the base station controller 9 of the private network sends a handover command to the mobile station 12 via the anchor mobile service switching centre, the mobile service switching centre 4 of the public network and the first base station controller 3a of the public network. The mobile service switching centre 10 of the private network adds routing information to the handover command which is used by the anchor mobile service switching centre to route the current call through the mobile service switching centre 10 of private network.

When the mobile station 12 receives the handover command, it knows from the message the beacon identity and base station identity code for the first base station 8a of the private network and the channel allocated to it. Assuming the case of an unsynchronised handover, the mobile station 12 sends handover access bursts to the first base station 8a of the private network in the allocated channel. There is then an SABM-UA exchange, following which the mobile station 12 sends a handover complete message. The handover complete message is propagated back via the anchor mobile service switching centre to the mobile service switching centre 4 of the public network and triggers the freeing of the resources used by the mobile station 12 when communicating via the fourth base station 2d of the public network.

On receiving the handover complete message, the mobile service switching centre 10 of the private network will send a location updating request to the home location register 6. In this case, the home location register 6. The mobile service switching centre 10 of the private network then enters the mobile station's subscriber in its visitor location register's database. The home location register updates its own record of the location of the mobile station 12 and transmits an insert subscriber data message to the mobile service switching centre 10 of the private network. The additional data in the insert subscriber data message is also stored in the visitor location register of the mobile service switching centre 10 of the private network. The home location register 6 sends a deregister mobile subscriber message to the mobile service switching centre 4 of the public network. The mobile service switching centre 4 of the public network then deletes the mobile station's subscriber's record from its visitor location register.

Thus, it can be seen that a mobile station, which is in dedicated mode and registered with the public network, will be handed over preferentially to a base station of the private network. This applies both when the mobile station is approaching a private network base station while in dedicated mode and when the mobile station enters dedicated mode from idle mode, e.g. on set up of a mobile terminated or mobile originating call, in a base station of the private network.

A mobile station 12 moving out of the coverage of the private network while in dedicated mode with the private network, it continues to receive control data in a slow associated control channel. The neighbouring base station data includes data for the first to third base stations 8a, 8b, 8c of the private network and the fourth base station 2d of the public network.

During gaps between transmit and receive time slots, the mobile station 12 measures the strengths of the signals on the beacon identities of the identified neighbour base stations and the signal strength of it current traffic channel. The traffic channel measurement and the best neighbour base station measurements, up to a maximum of six, are reported back to the base station controller 9 of the private network in the slow associated control channel by the mobile station 12.

Figure 5:
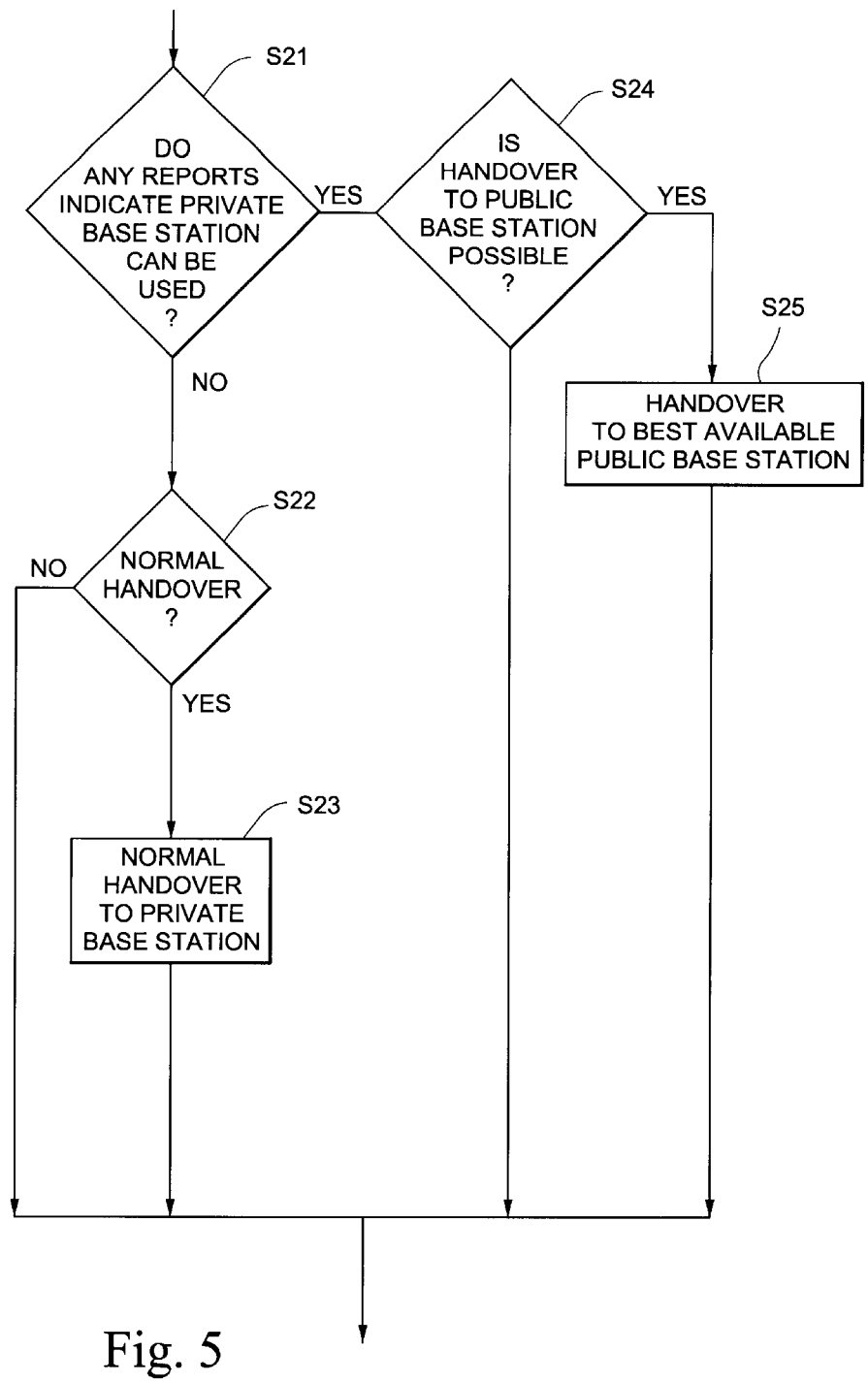
FIG. 5 is a flowchart illustrating a second handover in a system according to the present invention.

Referring to FIG. 5, when a set of measurement reports have been received by the base station controller 9 of the private network, the base station controller 9 determines (step s21) whether any of the reports indicate that a base station of the private network can be used. If so, these reports are analysed to determine whether a conventional handover is required and if so a handover to another base station of the private network is performed in the normal manner (step s22).

If it is determined that reports for base stations of the private network indicate that none of the private network base stations should be used by the mobile station 12 (step s23), the base station controller 9 determines whether a handover to a base station of the public network is possible (step s24) and starts a handover to the base station of the public network with the best measurement report (step s25).

The handover (step s25) to a base station of the public network is performed in the following manner.

The base station controller 9 of the private network sends a handover required message to the mobile service switching centre 10 of the private network. The handover required message includes the identity of the target base station, for example the fourth base station 2d of the public network, and the origin base station, e.g. the first base station 8a of the private network. The mobile service switching centre 10 of the private network sends a perform subsequent handover message to another mobile service switching centre of the private network which acts as the anchor mobile service switching centre. The anchor mobile service switching centre then sends a perform handover message to the mobile service switching centre 4 of the public network via the networks 5, 11. The mobile service switching centre 4 of the public network passes on the information in the perform handover message to the first base station controller 3a of the public network in a perform handover message. The first base station controller 3a of the public network then allocates a channel in the fourth base station 2d of the public network to the mobile station 12.

Once the resources required for the handover have been established, the first base station controller 3a of the public network sends a handover command to the mobile station 12 via the anchor mobile service switching centre, the mobile service switching centre 10 of the private network and the base station controller 9 of the private network. The mobile service switching centre 4 of the public network adds routing information to the handover command which is used by the anchor mobile service switching centre to route the current call through the mobile service switching centre 4 of public network.

When the mobile station 12 receives the handover command, it knows from the message the beacon identity and base station identity code for the fourth base station 2d of the private network and the channel allocated to it. Assuming the case of an unsynchronised handover, the mobile station 12 sends handover access bursts to the fourth base station 2d of the public network in the allocated channel. There is then an SABM-UA exchange, following which the mobile station 12 sends a handover complete message. The handover complete message is propagated back via the anchor mobile service switching centre to the mobile service switching centre 10 of the private network and triggers the freeing of the resources used by the mobile station 12 when communicating via the first base station 8a of the private network.

On receiving the handover complete message, the mobile service switching centre 4 of the public network will send a location updating request to the home location register 6. In this case, the home location register 6 replies with a location updating accept message. The mobile service switching centre 4 of the public network then enters the mobile station's subscriber in its visitor location register's database. The home location register 6 updates its own record of the location of the mobile station 12 and transmits an insert subscriber data message to the mobile service switching centre 4 of the public network. The additional data in the insert subscriber data message is also stored in the visitor location register of the mobile service switching centre 4 of the public network. The home location register 6 sends a deregister mobile subscriber message to the mobile service switching centre 10 of the private network. The mobile service switching centre 10 of the private network then deletes the mobile station's subscriber's record from its visitor location register.

Thus, it can be seen that a mobile station, which is in dedicated mode and registered with the private network, will not be handed over to a base station of the public network until no base stations of the private network are available.

In the foregoing example, the networks share a home location register. However, this is not essential. Furthermore, the relationship of a subscriber to the private network may need to be determined from the mobile subscriber identity part of the subscriber's IMSI rather than the mobile network part.

What is claimed is:

1. A method of operating a cellular telephone system having a subset of base stations only available to some subscribers to the system, the method comprising:

transmitting, to each mobile station, neighboring base station data for constructing a list of beacon identities for base stations neighboring the mobile station's serving base station, the transmission being made in a control channel, dedicated to the particular mobile station, wherein the list of beacon identities includes members of the said subset only if the subset is available to the mobile station's subscriber, receiving signal reports from the mobile station for the plurality of base stations, and controlling a handover by selecting a base station for use by the mobile station based on said reports and on whether the base station is a member of the subset, the handover being controlled such that mobile stations for which access to the subset of base stations is permitted are not handed over to base stations not forming part of the subset unless the signal reports for the base stations indicate that reliable communication cannot be effected between the mobile station and any member of the subset.

2. A method as in claim 1, wherein the transmitted data is configured for the generation of a beacon identity list including a beacon identity for a base station in said subset.

3. A method as in claim 2, wherein said base station serves a cell located wholly within a cell served by a base station which is not a member of the subset.

4. A method as in claim 1, wherein the base stations of the subset comprise the base stations of a private network to which the subscriber has access.

5. A method as in claim 1, wherein the base stations of the subset use a different radio technology to that used by the serving base station.

6. A method as in claim 1, further comprising:

maintaining a record of the neighbor relationship between a first base station in the subset of base stations and a second base station not in the subset, determining whether the mobile station's subscriber, when the mobile station is located in a cell served by said first base station of the public network, has an access-granting relationship with the base stations of the subset, and transmitting the data identifying the beacon identity of the second base station in said dedicated control channel if the mobile station's subscriber has said access-granting relationship with the base stations of the subset.

7. A method as in claim 1, wherein the neighboring base station data is arranged for the generation of a first beacon identity list if the mobile unit to which the list is to be transmitted does not have access to base stations in the subset, and a second beacon identity list similar to the first beacon identity list but extended to include a beacon identity of a base station in the subset if the mobile unit to which the list is to be transmitted has access to such base stations.

8. A method as in claim 1, wherein a handover of a mobile station currently served by a base station not of the subset to a base station of the subset is initiated if the signal report for that base station indicates that reliable communication can be effected with the mobile station using that base station.

9. A method as in claim 1, wherein handover of a mobile station currently served by a base station of the subset to a base station not of the subset is only initiated if the signal reports indicate that reliable communication cannot be continued using any base station in the subset.

10. A cellular mobile telephony system configured to perform a method as in claim 1.

11. A cellular mobile telephony system comprising a plurality of base stations under the control of one or more controllers, the base stations control means comprising:

means for generating, for each of one or more mobile stations currently served by the base stations, data by which the mobile station may construct a list of beacon identities for base stations neighboring the mobile station's serving base station, means for identifying whether a predetermined subset of the base stations is available for use by the mobile station's subscriber, and including the beacon identities of such base stations only if they are so available;

transmission means for transmitting said data in a control channel, dedicated to the particular mobile station, means for receiving signal reports from the mobile station for the plurality of base stations, and means for controlling a handover by electing a base station for use by the mobile station based on said reports and on whether the base station is a member of the subset, the handover being controlled such that mobile stations for which access to the subset of base stations is permitted are not handed over to base stations not forming part of the subset unless the signal reports for the base stations indicate that reliable communication cannot be effected between the mobile station and any member of the subset.

12. A system as in claim 11, wherein the data transmitted includes a beacon identity list including beacon identities for a base station in said subset.

13. A system as in claim 12, wherein said base station serves a cell located wholly within a cell served by a base station which is not a member of the subset.

14. A system as in claim 11, wherein the base stations of the subset comprise the base stations of a private network to which predetermined subscribers have access.

15. A system as in claim 11, wherein the base stations of the subset use a different radio technology compared to that used by the serving base station.

16. A system as in claim 11, further comprising:

means for maintaining a record of the neighbor relationship between a first base station in the subset of base stations and a second base station not in the subset, means for determining whether the mobile station's subscriber, when the mobile station is located in a cell served by said first base station of the public network, has an access-granting relationship with the base stations of the subset, and means for transmitting the data identifying the beacon identity of the second base station in said dedicated control channel if the mobile station's subscriber has said access-granting relationship with the base stations of the subset.

17. A system as in claim 11, further comprising:

means for generation of a first beacon identity list if the mobile unit to which the list to be transmitted does not have access to base stations in the subset, and for generating a second beacon identity list similar to the first beacon identity list but, extended to include a beacon identity of a base station in the subset if the mobile unit to which the list is to be transmitted has access to such base stations.

18. A system as in claim 11, wherein the handover means is arranged to initiate handover of a mobile station currently served by a base station not of the subset to a base station of the subset if the signal report for that base station indicates that reliable communication can be effected with the mobile station using that base station.

19. A system as in claim 11, wherein the handover means is arranged to initiate handover of a mobile station currently served by a base station of the subset to a base station not of the subset only if the signal reports indicate that reliable communication cannot be continued using any base station in the subset.

20. A method for controlling handover of a mobile station to a different base station in a cellular telephone system having a subset of base stations only available to some mobile station subscribers, said method comprising:

controlling handover of mobile stations for which subscriber access to said subset is permitted such that handover to a base station not in the subset does not occur unless reliable communication cannot be effected with any base station of the subset.

21. A cellular mobile telephony system comprising plural base stations and including a subset of base stations only available to some authorized mobile station subscribers, said system comprising:

means in each authorized mobile station for measuring received signal strength from each base station of the subset and communicating same to controller; and a controller which uses said received signal strength measurements to effect handover of an authorized mobile station out of said subset only if reliable communication cannot be expected with any base station of the subset.

* * * * *